US009954979B2

United States Patent
Herr et al.

(10) Patent No.: US 9,954,979 B2
(45) Date of Patent: Apr. 24, 2018

(54) PROTOCOL SELECTION FOR TRANSMISSION CONTROL PROTOCOL/INTERNET PROTOCOL (TCP/IP)

(71) Applicant: International Business Machines Corporation, Armonk, NY (US)

(72) Inventors: David A. Herr, Cary, NC (US); Constantinos Kassimis, Cary, NC (US); Jerry W. Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 14/859,684

(22) Filed: Sep. 21, 2015

(65) Prior Publication Data

US 2017/0085683 A1 Mar. 23, 2017

(51) Int. Cl.
*H04L 29/06* (2006.01)
*H04L 12/26* (2006.01)

(52) U.S. Cl.
CPC .......... *H04L 69/16* (2013.01); *H04L 43/0894* (2013.01); *H04L 43/16* (2013.01)

(58) Field of Classification Search
CPC ..................................... H04L 69/16
USPC ........................................... 709/212
See application file for complete search history.

(56) References Cited

U.S. PATENT DOCUMENTS

| 7,620,693 | B1 * | 11/2009 | Mott ..................... H04L 47/621 709/213 |
| 7,917,597 | B1 * | 3/2011 | Lentini ............... H04L 12/6418 370/389 |
| 7,996,482 | B1 * | 8/2011 | Evans ..................... H04L 29/06 709/212 |
| 8,024,417 | B2 * | 9/2011 | Mehrotra ............ H04L 67/1097 709/212 |

(Continued)

FOREIGN PATENT DOCUMENTS

JP 09289531 A 4/1997

OTHER PUBLICATIONS

Chelsio Communications, "IWARP: From Cluster to Cloud RDMA", 2014.*

(Continued)

*Primary Examiner* — O. C. Vostal
(74) *Attorney, Agent, or Firm* — Cantor Colburn LLP (57) ABSTRACT

Embodiments relate to protocol selection for transmission control protocol/internet protocol (TCP/IP). An aspect includes tracking connection data corresponding to a plurality of TCP/IP connections in a computer system. Another aspect includes determining, based on the tracked connection data, whether a particular connection of the plurality of TCP/IP connections is appropriate for sockets over remote direct memory access (RDMA) protocol. Another aspect includes, based on determining that the particular connection is appropriate for sockets over RDMA protocol, automatically enabling sockets over RDMA protocol for the connection. Yet another aspect includes, based on determining that the particular connection is not appropriate for sockets over RDMA protocol, automatically disabling sockets over RDMA protocol for the connection.

17 Claims, 6 Drawing Sheets

(56) References Cited

U.S. PATENT DOCUMENTS

| | | | | |
|---|---|---|---|---|
| 8,122,155 | B1* | 2/2012 | Marti | G06F 13/385 |
| | | | | 370/395.7 |
| 8,396,981 | B1* | 3/2013 | Lee | H04L 12/4625 |
| | | | | 709/203 |
| 8,688,798 | B1* | 4/2014 | Lentini | H04L 67/1097 |
| | | | | 709/212 |
| 9,842,083 | B2* | 12/2017 | Tsirkin | G06F 15/167 |
| 2002/0007420 | A1* | 1/2002 | Eydelman | G06F 9/54 |
| | | | | 709/235 |
| 2004/0010545 | A1* | 1/2004 | Pandya | H04L 29/06 |
| | | | | 709/203 |
| 2004/0010674 | A1* | 1/2004 | Boyd | G06F 12/023 |
| | | | | 711/170 |
| 2004/0225720 | A1* | 11/2004 | Pinkerton | H04L 29/06 |
| | | | | 709/212 |
| 2005/0105531 | A1* | 5/2005 | Zur | H04L 69/32 |
| | | | | 370/395.5 |
| 2005/0188074 | A1 | 8/2005 | Voruganti et al. | |
| 2006/0045099 | A1* | 3/2006 | Chang | H04L 69/16 |
| | | | | 370/400 |
| 2006/0056405 | A1* | 3/2006 | Chang | H04L 45/00 |
| | | | | 370/389 |
| 2006/0075067 | A1* | 4/2006 | Blackmore | H04L 69/16 |
| | | | | 709/217 |
| 2006/0259570 | A1* | 11/2006 | Feng | H04L 67/1097 |
| | | | | 709/213 |
| 2007/0033301 | A1* | 2/2007 | Aloni | G06F 13/128 |
| | | | | 710/22 |
| 2007/0165672 | A1* | 7/2007 | Keels | H04L 1/0061 |
| | | | | 370/474 |
| 2007/0226386 | A1* | 9/2007 | Sharp | G06F 13/385 |
| | | | | 710/62 |
| 2007/0226750 | A1* | 9/2007 | Sharp | H04L 67/1097 |
| | | | | 719/313 |
| 2008/0043750 | A1* | 2/2008 | Keels | H04L 49/9094 |
| | | | | 370/395.52 |
| 2010/0057932 | A1* | 3/2010 | Pope | H04L 69/16 |
| | | | | 709/236 |
| 2011/0106905 | A1* | 5/2011 | Frey | H04L 69/166 |
| | | | | 709/212 |
| 2012/0155256 | A1* | 6/2012 | Pope | G06F 13/128 |
| | | | | 370/230 |
| 2012/0265837 | A1* | 10/2012 | Grant | H04L 67/025 |
| | | | | 709/212 |
| 2013/0080562 | A1 | 3/2013 | Fox et al. | |
| 2013/0080652 | A1 | 3/2013 | Cradick et al. | |
| 2013/0198312 | A1* | 8/2013 | Tamir | G06F 15/167 |
| | | | | 709/212 |
| 2013/0275631 | A1* | 10/2013 | Magro | G06F 13/14 |
| | | | | 710/28 |
| 2013/0332557 | A1 | 12/2013 | Fox et al. | |
| 2013/0332677 | A1 | 12/2013 | Fitzpatrick et al. | |
| 2014/0019574 | A1* | 1/2014 | Cardona | G06F 15/167 |
| | | | | 709/212 |
| 2014/0052808 | A1* | 2/2014 | Krishnan | H04L 67/40 |
| | | | | 709/212 |
| 2014/0185623 | A1* | 7/2014 | Yam | H04L 47/765 |
| | | | | 370/401 |
| 2014/0201306 | A1* | 7/2014 | Hefty | H04L 67/1097 |
| | | | | 709/212 |
| 2016/0026605 | A1* | 1/2016 | Pandit | G06F 15/17 |
| | | | | 709/212 |
| 2016/0028819 | A1* | 1/2016 | Schultz | H04L 67/1097 |
| | | | | 709/212 |
| 2016/0057068 | A1* | 2/2016 | Arakawa | H04L 47/50 |
| | | | | 370/412 |
| 2016/0119238 | A1* | 4/2016 | Jia | H04L 47/12 |
| | | | | 709/224 |
| 2016/0162437 | A1* | 6/2016 | Aslam | G06F 9/5066 |
| | | | | 709/219 |
| 2016/0239323 | A1* | 8/2016 | Tsirkin | G06F 9/45558 |
| 2016/0357702 | A1* | 12/2016 | Shamis | G06F 15/167 |
| 2017/0012844 | A1* | 1/2017 | Ellison | H04L 41/0893 |
| 2017/0034269 | A1* | 2/2017 | Nagasubramaniam | |
| | | | | H04L 67/1097 |

OTHER PUBLICATIONS

Culley et al., "Marker PDU Aligned Framing for TCP Specification", RFC5044, 2007.*
Dalessandro et al., "A Performance Analysis of the Ammasso RDMA Enabled Ethernet Adapter and its iWARP API", 2005.*
Dalessandro et al., "Accelerating Web Protocols Using RDMA", 2007.*
Dalessandro et al., "iWarp Protocol Kernel Space Software Implementation", 2006.*
Goldenberg et al., "Transparently Achieving Superior Socket Performance Using Zero Copy Socket Direct Protocol over 20Gb/s InfiniBand Links", 2005.*
Grant et al., "A Study of Hardware Assisted IP over InfiniBand and its Impact on Enterprise Data Center Performance", 2010.*
Grant et al., "RDMA Capable iWARP over Datagrams", 2011.*
Hilland et al., "RDMA Protocol Verbs Specification", 2003.*
Huang et al., "High Performance Virtual Machine Migration and RDMA over Modern Interconnects", 2007.*
Huang et al., "High-Performance Design of HBase with RDMA over InfiniBand", 2012.*
Huo et al., "High Performance Sockets over Kernel Level Virtual Interface Archtecture", 2005.*
InfiniBand, "InfiniBand Architecture Specification vol. 1", Release 1.3, 2015.*
InfiniBand, "InfiniBand Architecture Specification vol. 1", Release 1.2.1, 2007.*
Kanevsky et al., "Enhanced Remote Direct Memory Access (RDMA) Connection Establishment", RFC6581, 2012.*
Ko et al., "iSCSI Extensions for RDMA Specification (Version 1.0)", 2003.*
Ko, "Technical Overview of iSCSI Extensions for RDMA (iSER) & Datamover Architecture of iSCSI (DA)", 2003.*
Krause, "HP Cluster Interconnects: The Next 5 Years", 2003.*
MacArthur et al., "Implementing TCP Socket over RDMA", 2014.*
Neeser et al.,"SoftRDMA: Implementing iWARP over TCP kernel sockets", 2010.*
Neteffect, "Understanding iWARP: Eliminating Overhead and Latency in multi-Gb Ethernet Networks", 2003.*
Pinkerton, "Sockets Direct Protocol v1.0", 2003.*
Pinkerton et al., "Sockets Direct Protocol (SDP) for iWARP over TCP (v1.0)", 2003.*
Pinkerton, "The Case for RDMA", 2002.*
Plant, "RDMAC Consortium Completes All Planned Specifications", 2003.*
Rashti et al., "10-Gigabit iWARP Ethernet: Comparative Performance Analysis with InfiniBand and Myrinet-10G", 2007.*
Recio et al., "A Remote Direct Memory Access Protocol Specification", RFC5040, 2007.*
Recio et al., "An RDMA Protocol Specification", 2003.*
Recio et al., "An RDMA Protocol Specification (Version 1.0)", 2002.*
Recio, "RDMA enabled NIC (RNIC) Verbs Overview", 2003.*
Romanow et al., "An Overview of RDMA over IP", 2002.*
Romanow et al., "Remote Direct Memory Access (RDMA) over IP Problem Statement", RFC4297, 2005.*
Shah et al., "Remote Directory Memory Access (RDMA) Protocol Extensions", RFC7306, 2014.*
Sur et al., "Can High-Performance Interconnects Benefit Hadoop Distributed File System?", 2010.*
Balaji et al., "Sockets Direct Protocol over InfiniBand in Clusters: Is it Beneficial ?", 2004.*
Goldenberg et al., "Zero Copy Sockets Direct Protocol over InfiniBand—Preliminary Implementation and Performance Analysis", 2005.*
Liu et al., "Implementting Efficient and Scalable Flow Control Schemes in MPI over InfiniBand", 2004.*

(56) References Cited

OTHER PUBLICATIONS

Pinkerton, "Sockets Direct Protocol v1.0 RDMA Consortium", 2003.*

Santhanaraman et al., "Designing Zero-Copy Message Passing Interface Derived Datatype Communication Over InfiniBand: Alternative Approaches and Performance Evaluation", 2005.*

Tipparaju et al., "Host-Assisted Zero-Copy Remote Memory Access Communication on InfiniBand", 2004.*

* cited by examiner

PROTOCOL SELECTION FOR TRANSMISSION CONTROL PROTOCOL/INTERNET PROTOCOL (TCP/IP)

BACKGROUND

The present invention relates generally to computer networking, and more specifically, to protocol selection for applications using the transmission control protocol/internet protocol (TCP/IP).

There is a large existing base of servers, applications, and clients that are coded to the TCP/IP sockets interface for communication. For these programs to exploit high speed interconnects such as remote direct memory access (RDMA), significant rewriting of their communication methods would be required. This is a major undertaking and may not even be practical in some cases (for example legacy applications whose source code or coding skill is lost). In addition to the implementation cost and long term cost of sustaining multiple application program interfaces (APIs) in each application, new and unique network administrative requirements must be addressed (e.g. configuration, enablement, high availability, security, network load balancing, and various TCP/IP related quality of services).

Sockets Direct Protocol (SDP) is an example of a sockets over RDMA protocol that may be used to bypass TCP/IP and provides an alternative protocol stack "underneath" the sockets layer that can exploit RDMA technology. This solution allows applications, which are coded to the widely adopted sockets standard, to run unmodified and the SDP stack under the sockets layer handles all the communication over the RDMA network, completely bypassing TCP/IP. However, businesses still rely on legacy firewalls, load balancers, IP filters, and other TCP/IP based technologies to manage and secure their networks. These technologies rely on the ability to manage TCP/IP setup flows to perform their function. Because SDP dispenses with these flows, these network elements would have to be reinvented for SDP. Additionally, many TCP/IP stacks are mature products with built-in security, quality of service, tracing, and auditing, etc. capabilities that either have no corresponding feature in SDP or a completely different approach to providing similar features.

Because of these limitations, SDP could be perceived as unsuitable for some multi-tier enterprise level business environments with complicated security, high availability and quality of service requirements. Shared memory communications over RDMA (SMC-R) is an example of a sockets over RDMA protocol that employs a hybrid communication model. SMC-R uses both TCP/IP and native RDMA services. It relies on traditional TCP/IP connection establishment protocols to establish a connection and then relies on RDMA technology to speed up the transfer of data associated with the connection. By exploiting normal TCP/IP connection establishment protocols SMC-R is able to retain the key benefits of the TCP/IP network infrastructure. Therefore, SMC-R protocol may be implemented for communications in such an environment.

SUMMARY

Embodiments include a method, system, and computer program product for protocol selection for applications using the transmission control protocol/internet protocol (TCP/IP). An aspect includes tracking connection data corresponding to a plurality of TCP/IP connections in a computer system. Another aspect includes determining, based on the tracked connection data, whether a particular connection of the plurality of TCP/IP connections is appropriate for sockets over remote direct memory access (RDMA) protocol. Another aspect includes, based on determining that the particular connection is appropriate for sockets over RDMA protocol, automatically enabling sockets over RDMA protocol for the connection. Yet another aspect includes, based on determining that the particular connection is not appropriate for sockets over RDMA protocol, automatically disabling sockets over RDMA protocol for the connection.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of protocol selection for applications using TCP/IP are provided, with exemplary embodiments being discussed below in detail. While a sockets over RDMA protocols may generally help optimize performance of communications for TCP sockets-based applications, there are scenarios where the traffic patterns of applications are not well suited to RDMA from a performance standpoint. Enabling or disabling a sockets over RDMA protocol, such as SMC-R, via a manual configuration step that an administrator must perform on an application by application basis does not take into considerations the possible variation in traffic patterns over time. Therefore, protocol selection for TCP/IP is implemented to automatically determine whether a sockets over RDMA protocol is appropriate for particular connections.

For SMC-R connections, TCP endpoints negotiate the use of the SMC-R as part of the normal TCP connection establishment. Once both peers agree to use SMC-R data flows for a TCP connection, data is moved across pre-registered shared memory buffers in the two peers. SMC-R may show latency reductions over 85% and networking CPU reductions of over 60% as compared to a standard TCP connection. Therefore, SMC-R provides performance benefits for many workloads. However, some workloads may not benefit from the SMC-R protocol. Specifically, relatively short-lived TCP connections that exchange relatively little data may not perform well with the SMC-R protocol. For example, a workload may establish a TCP connection for every request, send a request for a relatively small payload, receive the small payload in response, and then terminate the connection. In this scenario, use of SMC-R for repeated relatively small payload requests may degrade overall performance, due to additional negotiation overhead required to set up each SMC-R connection as compared to a regular TCP/IP connection. Specifically, the SMC-R connection set up requires 3 additional TCP segments to be exchanged beyond the normal TCP handshake processing that is performed to establish a connection. For longer lived TCP connections, the overhead and network latency impact of the additional TCP segments is negligible. However, for shorter-lived connections, performance may be degraded by use of SMC-R.

Traffic patterns may be monitored, and connection data may be compiled and tracked, at both the server and the client side to determine whether particular connections show patterns indicating suitability for a sockets over RDMA protocol. Sockets over RDMA protocol may be automatically turned off and on, on either the server or client side, for particular connections based on observed connection data. The determination of whether sockets over RDMA protocol is appropriate for a particular connection may be made based on comparison of stored connection data to one or more thresholds. The connection data statistics that are maintained provide a historical perspective on the communication pattern for a given workload and will adjust over time as the workload communication patterns change, giving an automatic selection of the best suited protocol (sockets over RDMA protocol or TCP/IP) for a given stream socket. The sockets over RDMA protocol can also be extended to allow dynamic fallback to standard TCP/IP communications, even after sockets over RDMA protocol has been enabled on a connection, for example, triggering a connection fall back to standard TCP protocol if it is determined that the data pattern for a connection has changed sufficiently to no longer be a good sockets over RDMA protocol candidate. When protocol selection for TCP/IP is enabled, a monitoring function analyzes every TCP connection to/from the system and maintains, for example, the following statistics: number of bytes exchanged on the TCP connection; number of TCP segments sent/received on a TCP Connection; and average send size on the socket API. With these statistics, each connection is graded as being a good candidate for sockets over RDMA protocol or not based on one or more thresholds.

On the server side, the connection data may be analyzed at the port level, while on the client side, the connection data may be analyzed on the connection level based on the IP address and port of the target server. For example, for a TCP server listening on port 80, the statistics may indicate that 65% of all incoming connections could benefit from sockets over RDMA protocol. Or, for outbound TCP connections to a server designated by IP address 10.1.1.1 and port 5000, it may be determined that only 10% of connections are good candidates for sockets over RDMA protocol. As TCP connections are established (inbound or outbound) the monitoring function will make a determination on whether sockets over RDMA protocol should be used for each specific TCP connection. For incoming connections this may be based on the percentage of past/current TCP connections to a specific TCP server (i.e. listening port) that were deemed good sockets over RDMA protocol candidates or not. In the previous example, if 65% of all incoming connections to port 80 have shown that they would benefit from SMC-R, a new incoming TCP connection will be marked as sockets over RDMA protocol eligible. On the other hand, for outbound TCP connections to 10.1.1.1 and port 5000, the monitor would automatically disable sockets over RDMA protocol processing since only a very small number of connections have demonstrated benefits from using sockets over RDMA protocol. The monitoring is ongoing and dynamic in nature: as the workload behavior changes so will the statistics, enabling the system to make the optimal selection for the use of sockets over RDMA protocol for future connections in and out of the system. Historical connection data may also be aged out over time to allow for major changes in workload behavior to be detected.

Figure 1:
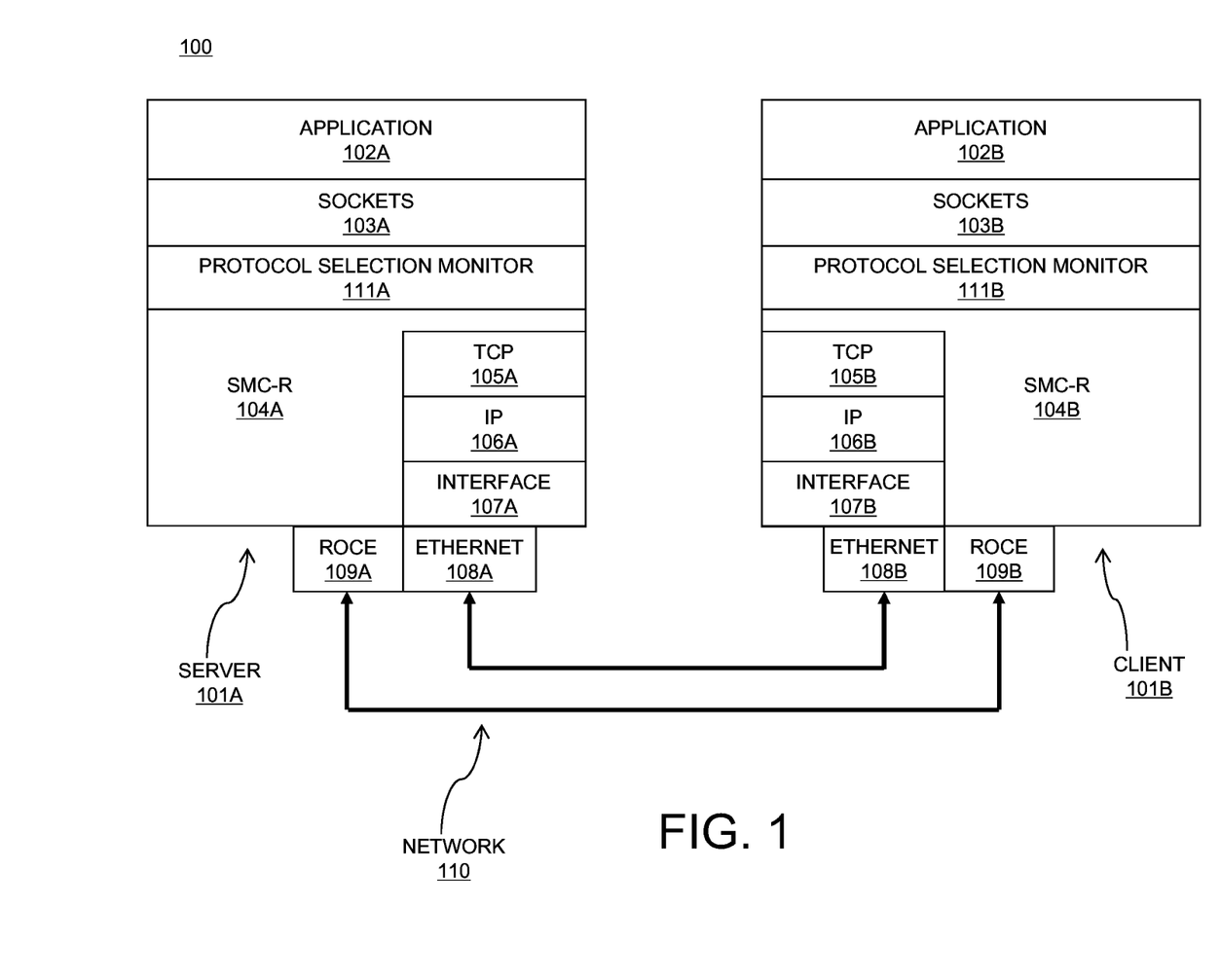
FIG. 1 depicts a system for protocol selection for TCP/IP in accordance with an embodiment.

FIG. 1 depicts a system 100 for protocol selection for TCP/IP in accordance with an embodiment. System 100 includes a server 101A, and a client 101B, each of which may comprise any appropriate type of computer system. Application 102A runs on server 101A, and communicates with application 102B running on client 101B via network 110, which may be any appropriate type of computer network. Server 101A and client 101B may communicate via network 110 using either a TCP/IP connection or a SMC-R connection. In server 101A, sockets 103A may interface between application 102A and network 110 via SMC-R protocol 104A and RDMA over converged Ethernet (ROCE) 109A for a SMC-R connection, or via TCP/IP protocol 105A/106A, interface 107A, and Ethernet network interface card (NIC) 108A for a TCP/IP connection. In server 101B, sockets 103B may interface between application 102B and network 110 via SMC-R protocol 104B and ROCE 109B for a SMC-R connection, or via TCP/IP protocol 105B/106B, interface 107B, and Ethernet NIC 108B for a TCP/IP connection. Server 101A and client 101B each further include a respective protocol selection monitor 111A, which may implement embodiments of protocol selection for TCP/IP as are discussed below. FIG. 1 is shown for illustrative purposes only; for example, systems such as servers 101A and client 101B may communicate via any appropriate sockets over RDMA protocol in various embodiments.

Figure 2:
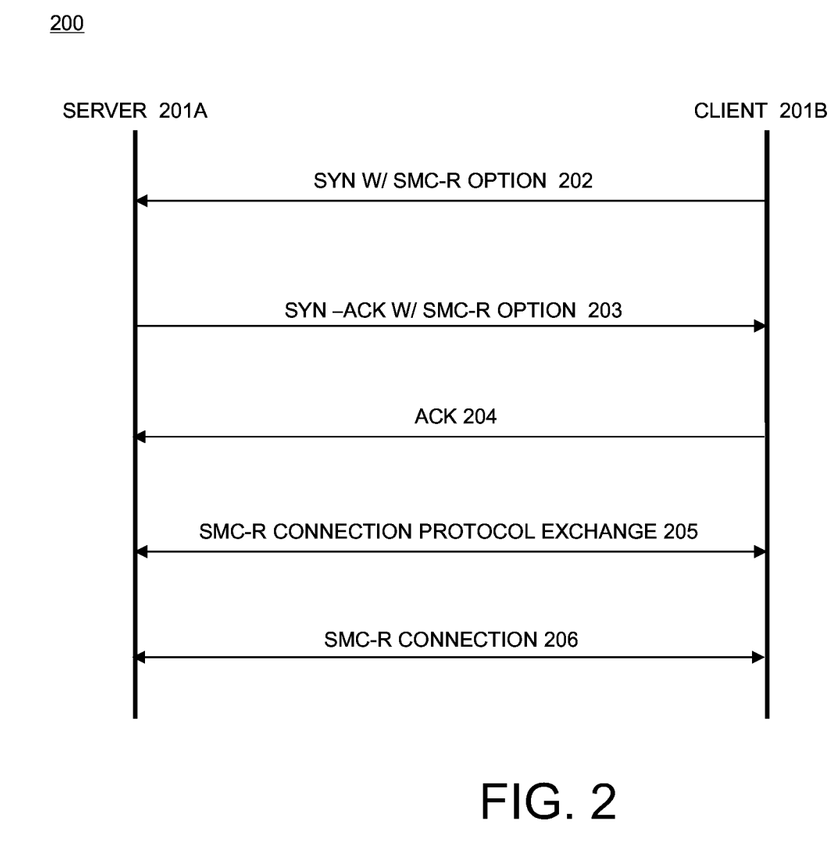
FIG. 2 depicts an example of establishment of a sockets over RDMA protocol connection using protocol selection for TCP/IP in accordance with an embodiment.

FIG. 2 depicts an example a segment exchange 200 for establishment of a sockets over RDMA protocol connection, such as a SMC-R connection, using protocol selection for TCP/IP in accordance with an embodiment. Server 201A of FIG. 2 may correspond to server 101A of FIG. 1, and client 201B of FIG. 2 may correspond to client 101B of FIG. 1. First, the client 201B sends a SYN segment to the server 201A to request a TCP/IP connection. The SYN includes an option indicating that the client 201B has enabled SMC-R for this connection. Then, the server 201A replies to the client 201B with a SYN-ACK segment, which also includes an option indicating that the server 201A has enabled SMC-R for this connection. Next, the client 201A replies with an ACK 204, establishing a TCP/IP connection between the server 201A and the client 201B. Because both the client 201A and the server 201B indicated that they were enabling SMC-R for this connection, a SMC-R connection protocol exchange 205 is then performed between the server 201A and the client 201B to set up the SMC-R connection. Lastly, the server 201A and client 201B exchange data via the SMC-R connection 206. SMC-R is used in FIG. 2 for illustrative purposes only; in various embodiments of FIG. 2, the server and client may communicate via any appropriate sockets over RDMA protocol.

Figure 3:
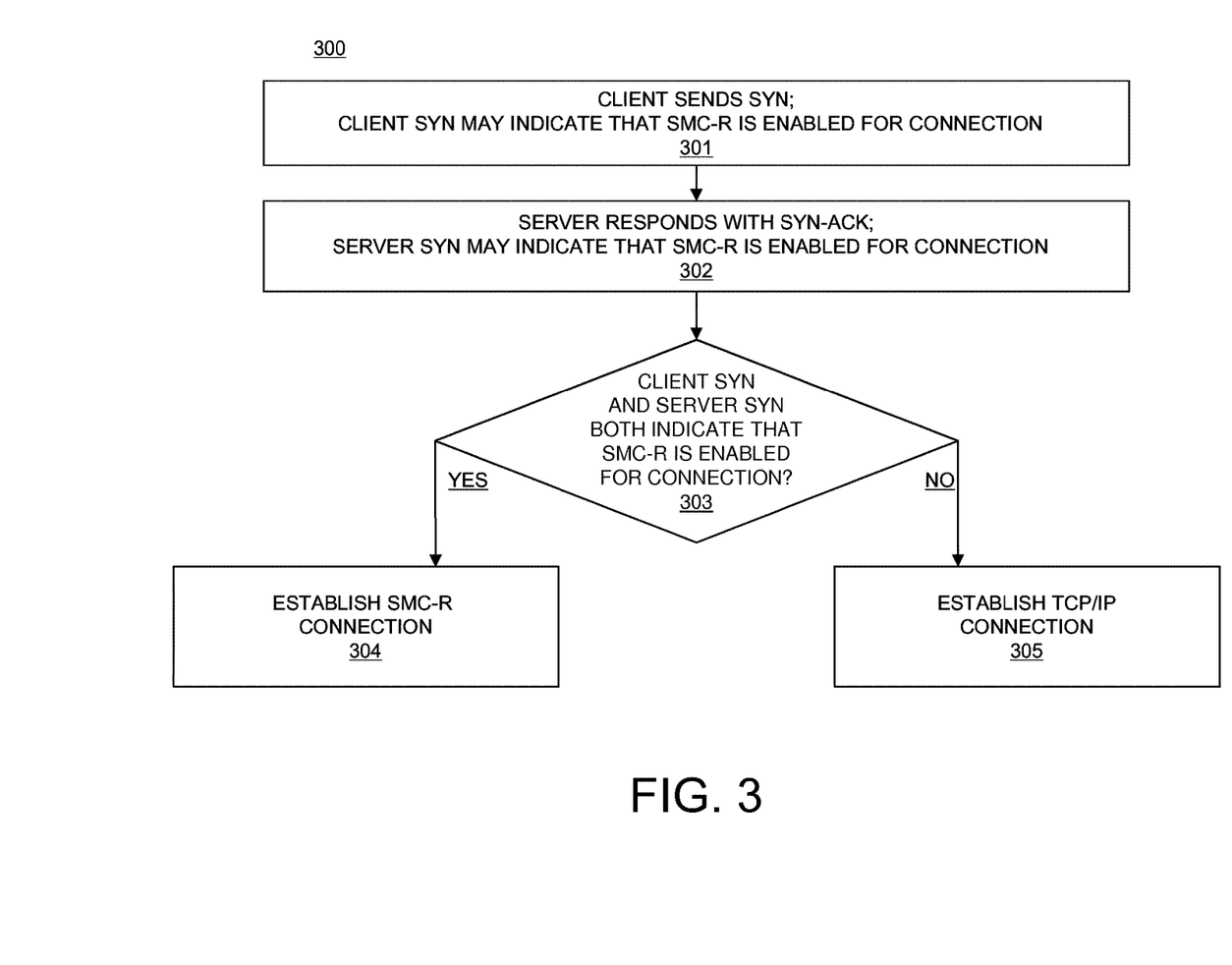
FIG. 3 depicts a process flow for establishment of a sockets over RDMA protocol connection using protocol selection for TCP/IP in accordance with an embodiment.

FIG. 3 depicts a method 300 for establishment of a sockets over RDMA protocol connection, such as a SMC-R connection, using protocol selection for TCP/IP in accordance with an embodiment. FIG. 3 is discussed with respect to FIGS. 1-2. First, in block 301, a client, such as client 201B, sends a SYN segment to a server, such as server 201A, requesting a TCP/IP connection. The SYN that is sent in block 301 may either include an option indicating that the client has enabled SMC-R for this connection, or not include the option indicating that the client has enabled SMC-R for this connection. The protocol selection monitor in the client makes the determination as to whether to include the option in the SYN segment of block 301 based on method 500 of FIG. 5, which is discussed below. Then, in block 302, the server replies to the client with a SYN-ACK segment. The SYN that is sent in block 302 may either include an option indicating that the server has enabled SMC-R for this connection, or not include the option indicating that the server has enabled SMC-R for this connection. The protocol selection monitor in the server makes the determination as to whether to include the option in the SYN segment of block 302 based on method 400 of FIG. 4, which is discussed below. Next, in block 303, it is determined whether both the SYN segment of block 301 and the SYN segment of block 302 included the SMC-R enable option. If it is determined in block 303 that both the SYN segment of block 301 and the SYN segment of block 302 include the SMC-R enable option, flow proceeds from block 303 to block 304, and the server and client establish a SMC-R connection. If it is determined in block 303 that one or both the SYN segment of block 301 and the SYN segment of block 302 did not include the SMC-R enable option, flow proceeds from block 303 to block 305, and the server and client establish a regular TCP/IP connection. SMC-R is used in FIG. 3 for illustrative purposes only; in various embodiments of FIG. 3, the server and client may communicate via any appropriate sockets over RDMA protocol.

Figure 4:
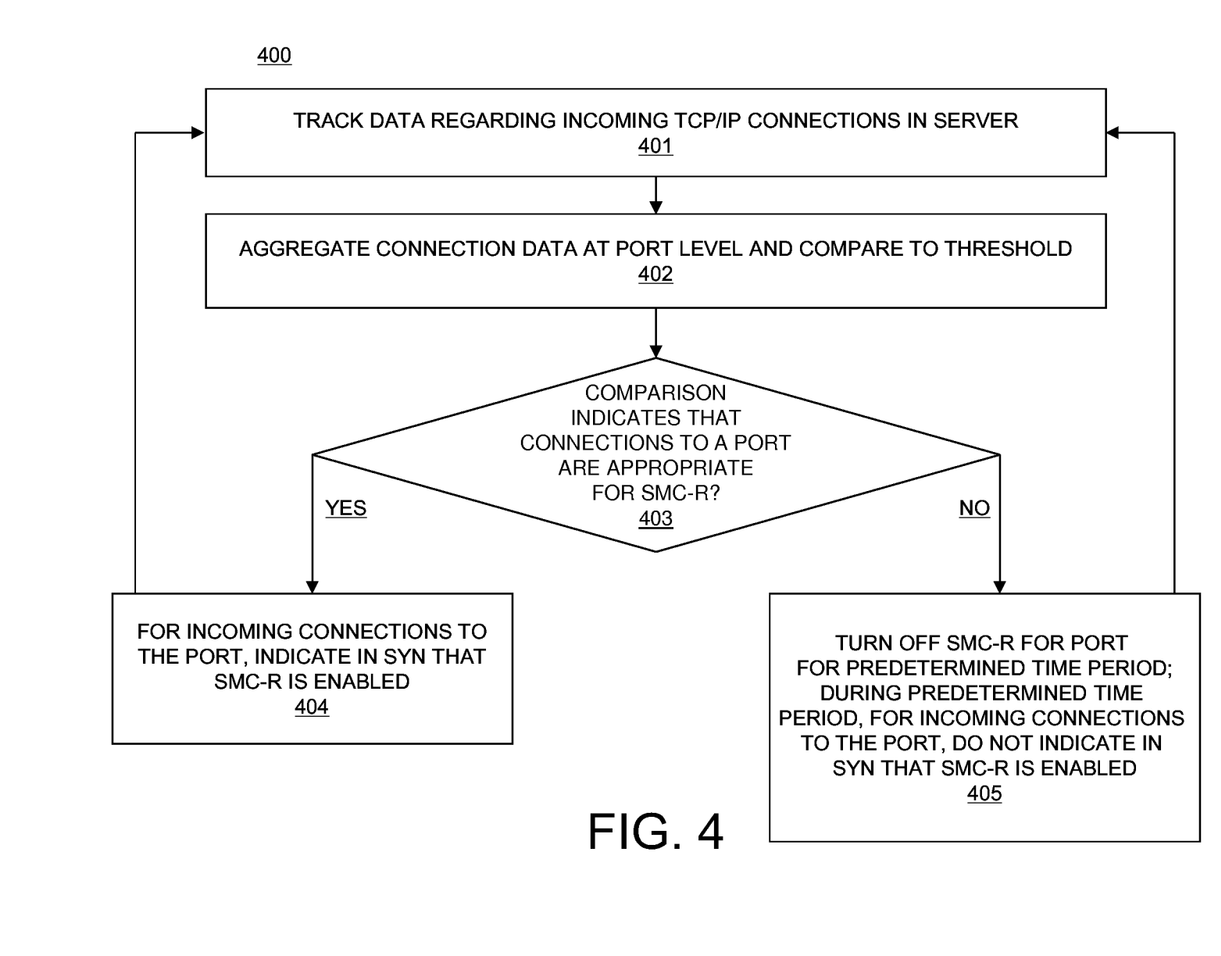
FIG. 4 depicts a process flow for protocol selection for TCP/IP in a server in accordance with an embodiment.

FIG. 4 depicts a method 400 for protocol selection for TCP/IP in a server in accordance with an embodiment. Method 400 may be implemented in a server such as server 101A/201A of FIGS. 1 and 2, and is used to determine whether to enable a sockets over RDMA protocol, such as a SMC-R, for a particular connection. In some embodiments, when the sockets over RDMA protocol is enabled for a connection, the SMC-R enable option is included in the SYN segment during connection setup, such as segment 203 of FIG. 2, or as is performed in block 302 of FIG. 3. First, in block 401, the protocol selection monitor in the server tracks data regarding all incoming TCP/IP connections in the server. The connection data that is tracked may include the number of bytes exchanged per connection, the number of TCP segments sent/received per connection, and an average send size on the socket API. The connection data may be stored in a log file in any appropriate memory in the server, and each connection may be identified by the local and remote IP address, and the local and remote port, of the connection. Next, in block 402, the connection data is aggregated at the port level, i.e., data for all connections on the same port is considered together. For example, an average number of bytes exchanged per connection for a single port on the server may be determined in block 402. Then, in block 403, the aggregated statistics for each port are compared to one or more thresholds. The thresholds are set to ensure that connections that are likely to involve relatively small transfers of data do not use SMC-R.

If it is determined in block 403 that the statistics for a port on the server indicate that connections to that port are appropriate for SMC-R (e.g., the average number of bytes exchanged per connection on that port is smaller than the threshold), the flow proceeds from block 403 to block 404, and SMC-R is enabled for that port. While SMC-R is enabled for a particular port, when the server receives a SYN from a client requesting a connection to the particular port, the server responds with a SYN (as performed in block 302) that includes the SMC-R enable option. Flow proceeds from block 404 to block 401, and the server continues tracking connection data. If the connection data for a particular port changes such that connections to the particular port are not appropriate for SMC-R (as determined in block 403), SMC-R may be disabled for the particular port in a subsequent execution of method 400.

If it is determined in block 403 that the statistics for a port on the server indicate that connections to that port are not appropriate for SMC-R (e.g., the average number of bytes exchanged per connection on that port is larger than the threshold), the flow proceeds from block 403 to block 405, and SMC-R is disabled for that port for a predetermined amount of time. During the predetermined amount of time that SMC-R is disabled for a particular port, when the server receives a SYN from a client requesting a connection to the particular port, the server responds with a SYN (as performed in block 302) that does not include the SMC-R enable option. Flow proceeds back to block 401 from block 405, and the server continues tracking connection data. If the connection data for a particular port has changed such that connections to the particular port are appropriate for SMC-R after the elapsing of the predetermined amount of time (as determined in block 403), SMC-R may be enabled for the particular port in a subsequent execution of method 400. Connection data tracking, port-level aggregation, and determining whether SMC-R is appropriate, as described in method 400, may be performed for each individual port in the server that accepts incoming TCP connections. SMC-R is used in FIG. 4 for illustrative purposes only; in various embodiments of FIG. 4, the server and client may communicate via any appropriate sockets over RDMA protocol.

Figure 5:
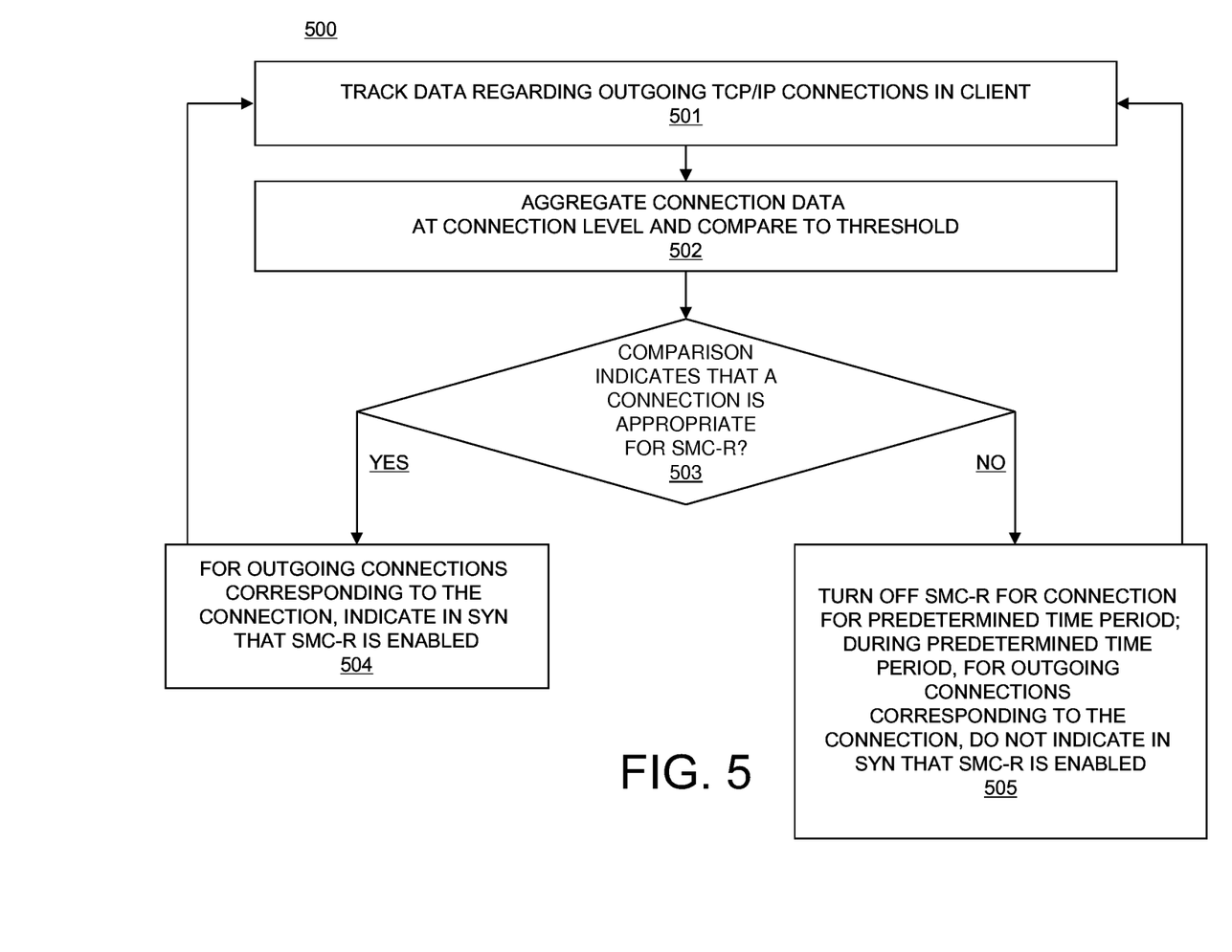
FIG. 5 depicts a process flow for protocol selection for TCP/IP in a client in accordance with an embodiment.

FIG. 5 depicts a method 500 for protocol selection for TCP/IP in a client in accordance with an embodiment. Method 500 may be implemented in a client such as client 101B/201B of FIGS. 1 and 2, and is used to determine whether to enable a sockets over RDMA protocol, such as a SMC-R, for a particular connection. In some embodiments, when the sockets over RDMA protocol is enabled for a connection, the SMC-R enable option is included in the SYN segment during connection setup, such as segment 202 of FIG. 2, or as is performed in block 301 of FIG. 3. First, in block 501, the protocol selection monitor in the client tracks data regarding all outgoing TCP/IP connections from the client. The connection data that is tracked may include the number of bytes exchanged per connection, the number of TCP segments sent/received per connection, and an average send size on the socket API. The connection data may be stored in a log file in any appropriate memory in the client, and each connection may be identified by the local and remote IP address, and local and remote port, of the connection. Next, in block 502, the connection data is aggregated at the connection level based on the remote IP address and port. For example, an average number of bytes exchanged per connection having the same remote IP address and port, may be determined in block 502. Then, in block 503, the aggregated statistics for each connection target are compared to one or more thresholds. The thresholds are set to ensure that connections that are likely to involve relatively small transfers of data do not use SMC-R.

If it is determined in block 503 that the statistics for a connection indicate that the connection is appropriate for SMC-R (e.g., the average number of bytes exchanged per instance of the connection is smaller than the threshold), the flow proceeds from block 503 to block 504, and SMC-R is enabled for the connection. While SMC-R is enabled for a particular connection, when the client sends a SYN to a server corresponding to the particular connection (as performed in block 301), the SYN includes the SMC-R enable option. Flow proceeds from block 504 to block 501, and the client continues tracking connection data. If the connection data for a particular connection changes such that the connection is not appropriate for SMC-R (as determined in block 503), SMC-R may be disabled for the particular connection in a subsequent execution of method 500.

If it is determined in block 503 that the statistics for a connection indicate that the connection is not appropriate for SMC-R (e.g., the average number of bytes exchanged per instance of the connection is larger than the threshold), the flow proceeds from block 503 to block 505, and SMC-R is disabled for that connection for a predetermined amount of time. During the predetermined amount of time that SMC-R is disabled for a particular connection, when the client sends a SYN to a server corresponding to the particular connection (as performed in block 301), the SYN does not include the SMC-R enable option. Flow proceeds back to block 501 from block 505, and the client continues tracking connection data. If the connection data for a connection has changed such that the connection is appropriate for SMC-R after the elapsing of the predetermined amount of time (as determined in block 503), SMC-R may be enabled for the particular connection in a subsequent execution of method 500. Connection data tracking, connection-level aggregation, and determining whether SMC-R is appropriate, as described in method 500, may be performed for each individual outgoing TCP connection in the client. SMC-R is used in FIG. 5 for illustrative purposes only; in various embodiments of FIG. 5, the server and client may communicate via any appropriate sockets over RDMA protocol.

In various embodiments, a single computer system may be both a client and server, and may implement both method 400 of FIG. 4 and method 500 of FIG. 5. Further, any appropriate connection data may be tracked by a server or by a client, and one or more thresholds may be set at the server or at the client to any appropriate values.

Figure 6:
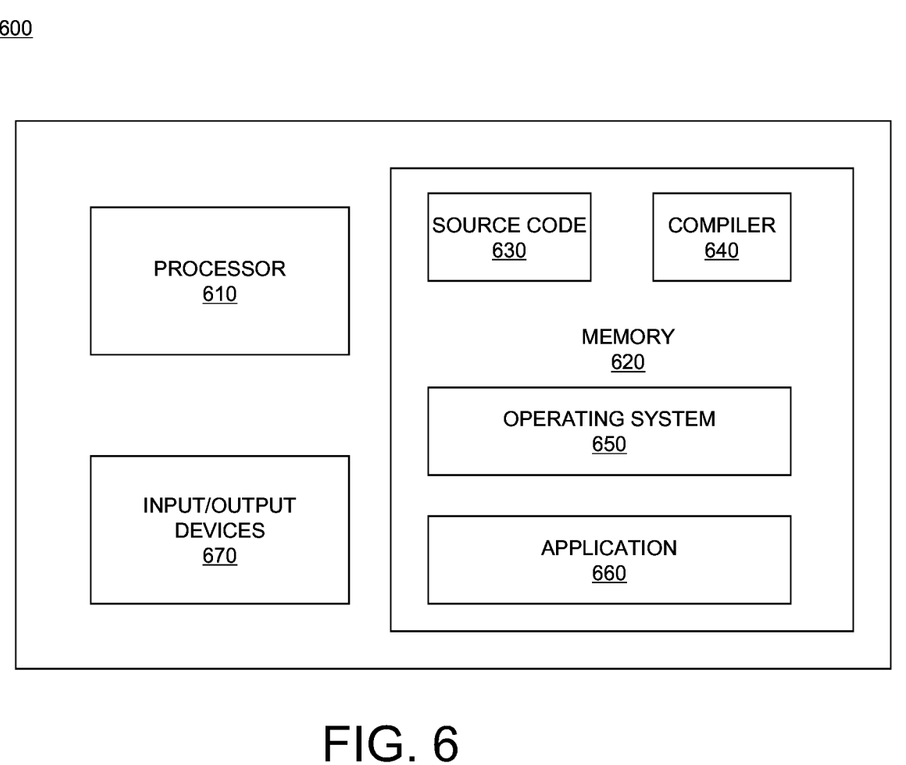
FIG. 6 depicts an example of a computer for use in conjunction with protocol selection for TCP/IP in accordance with an embodiment.

FIG. 6 illustrates an example of a computer 600 which may utilize exemplary embodiments of protocol selection for TCP/IP. Various operations discussed above may utilize the capabilities of the computer 600. One or more of the capabilities of the computer 600 may be incorporated in any element, module, application, and/or component discussed herein. For example, embodiments of computer 600 may comprise server 101A/201A and/or client 101B/201B.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include automatically avoiding usage of sockets over RDMA protocol for connections that do not benefit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for protocol selection for transmission control protocol/internet protocol (TCP/IP), the method comprising:
    tracking connection data corresponding to a plurality of TCP/IP connections in a computer system;
    determining, based on the tracked connection data, whether a particular connection of the plurality of TCP/IP connections is appropriate for sockets over remote direct memory access (RDMA) protocol;
    based on determining that the particular connection is appropriate for sockets over RDMA protocol, automatically enabling sockets over RDMA protocol for the connection; and
    based on determining that the particular connection is not appropriate for sockets over RDMA protocol, automatically disabling sockets over RDMA protocol for the connection,
    wherein determining whether the particular connection is appropriate for sockets over RDMA protocol comprises:
        aggregating the connection data for one of all instances of a connection of a client and all connections to a port of a server; and
        determining, based on the aggregated connection data, whether an average amount of data exchanged per connection is greater than a threshold;
    based on the average amount of data exchanged per connection being greater than a threshold, determining that the particular connection is appropriate for sockets over RDMA protocol; and
    based on the average amount of data exchanged per connection being less than a threshold, determining that the particular connection is not appropriate for sockets over RDMA protocol.

2. The method of claim 1, wherein the computer system comprises the server computer system, and wherein the plurality of TCP/IP connections comprise incoming connections.

3. The method of claim 2, wherein automatically enabling sockets over RDMA protocol for the connection comprises enabling sockets over RDMA protocol for all connections to the port;
    wherein automatically disabling sockets over RDMA protocol for the connection comprises disabling sockets over RDMA protocol for all connections to the port for a predetermined amount of time; and
    further comprising repeating the tracking, determining, and enabling or disabling of sockets over RDMA protocol during operation of the server.

4. The method of claim 1, wherein the computer system comprises the client computer system, and wherein the plurality of TCP/IP connections comprise outgoing connections.

5. The method of claim 4, wherein
    the connection is identified based on the remote IP address and port.

6. The method of claim 5, wherein automatically enabling sockets over RDMA protocol for the connection comprises enabling sockets over RDMA protocol for all instances of the connection;
    wherein automatically disabling sockets over RDMA protocol for the connection comprises disabling sockets over RDMA protocol for all instances of the connection for a predetermined amount of time; and further comprising repeating the tracking, determining, and enabling or disabling of sockets over RDMA protocol during operation of the server.

7. The method of claim 1, further comprising establishing a connection between a client and a server, wherein establishing the connection comprises:
receiving, by a server from a client, a first segment comprising a request for a connection, wherein the first segment includes a first option indicating that the connection is appropriate for sockets over RDMA protocol based on sockets over RDMA protocol being enabled for the connection;
sending, by the server to a client, a second segment comprising response to the first segment, wherein the second segment includes a second option indicating that the connection is appropriate for sockets over RDMA protocol based on sockets over RDMA protocol being enabled for the connection;
determining whether the first segment includes the first option and the second segment includes the second option;
based on determining that the first segment includes the first option and the second segment includes the second option, establishing the sockets over RDMA protocol connection between the client and the server; and
based on at least one of the first segment not including the first option and the second segment not including the second option, establishing a TCP/IP connection between the client and the server.

8. A computer program product for implementing protocol selection for transmission control protocol/internet protocol (TCP/IP), the computer program product comprising:
a non-transitory computer readable storage medium having program instructions embodied therewith, the program instructions readable by a processing circuit to cause the processing circuit to perform a method comprising:
tracking connection data corresponding to a plurality of TCP/IP connections in a computer system;
determining, based on the tracked connection data, whether a particular connection of the plurality of TCP/IP connections is appropriate sockets over remote direct memory access (RDMA) protocol;
based on determining that the particular connection is appropriate for sockets over RDMA protocol, automatically enabling sockets over RDMA protocol for the connection; and
based on determining that the particular connection is not appropriate for sockets over RDMA protocol, automatically disabling sockets over RDMA protocol for the connection,
wherein determining whether the particular connection is appropriate for sockets over RDMA protocol comprises:
aggregating the connection data for one of all instances of a connection of a client computer system and all connections to a port of a server computer system; and
determining, based on the aggregated connection data, whether an average amount of data exchanged per connection is greater than a threshold;
based on the average amount of data exchanged per connection being greater than a threshold, determining that the particular connection is appropriate for sockets over RDMA protocol; and
based on the average amount of data exchanged per connection being less than a threshold, determining that the particular connection is not appropriate for sockets over RDMA protocol.

9. The computer program product of claim 8, wherein the computer system comprises the server computer system, and wherein the plurality of TCP/IP connections comprise incoming connections.

10. The computer program product of claim 9, wherein automatically enabling sockets over RDMA protocol for the connection comprises enabling sockets over RDMA protocol for all connections to the port;
wherein automatically disabling sockets over RDMA protocol for the connection comprises disabling sockets over RDMA protocol for all connections to the port for a predetermined amount of time; and
further comprising repeating the tracking, determining, and enabling or disabling of sockets over RDMA protocol during operation of the server.

11. The computer program product of claim 8, wherein the computer system comprises the client computer system, and wherein the plurality of TCP/IP connections comprise outgoing connections.

12. The computer program product of claim 11, wherein the connection is identified based on the remote IP address and port.

13. The computer program product of claim 12, wherein automatically enabling sockets over RDMA protocol for the connection comprises enabling sockets over RDMA protocol for all instances of the connection;
wherein automatically disabling sockets over RDMA protocol for the connection comprises disabling sockets over RDMA protocol for all instances of the connection for a predetermined amount of time; and
further comprising repeating the tracking, determining, and enabling or disabling of sockets over RDMA protocol during operation of the server.

14. A computer system for protocol selection for transmission control protocol/internet protocol (tcp/ip), the system comprising:
a memory; and
a processor, communicatively coupled to said memory, the computer system configured to perform a method comprising:
tracking connection data corresponding to a plurality of TCP/IP connections in a computer system;
determining, based on the tracked connection data, whether a particular connection of the plurality of TCP/IP connections is appropriate for sockets over remote direct memory access (RDMA) protocol;
based on determining that the particular connection is appropriate for sockets over RDMA protocol, automatically enabling sockets over RDMA protocol for the connection; and
based on determining that the particular connection is not appropriate for sockets over RDMA protocol, automatically disabling sockets over RDMA protocol for the connection,
wherein determining whether the particular connection is appropriate for sockets over RDMA protocol comprises:
aggregating the connection data for one of all instances of a connection of a client computer system and all connections to a port of a server computer system; and determining, based on the aggregated connection data, whether an average amount of data exchanged per connection is greater than a threshold;

based on the average amount of data exchanged per connection being greater than a threshold, determining that the particular connection is appropriate for sockets over RDMA protocol; and based on the average amount of data exchanged per connection being less than a threshold, determining that the particular connection is not appropriate for sockets over RDMA protocol.

15. The system of claim 14, wherein the computer system comprises the server computer system, and wherein the plurality of TCP/IP connections comprise incoming connections.

16. The system of claim 14, wherein the computer system comprises the client computer system, and wherein the plurality of TCP/IP connections comprise outgoing connections.

17. The system of claim 16,
wherein the connection is identified based on a local IP address and port, and a remote IP address and port.

* * * * *